Patented Mar. 25, 1941

2,236,051

UNITED STATES PATENT OFFICE 2,236,051

PIGMENT AND PAINT AND METHOD OF MAKING SAME

Louis E. Barton, Windsor, Conn.

No Drawing. Application December 9, 1938, Serial No. 244,768

21 Claims. (Cl. 134—67)

This invention relates to pigments, their preparation and application and more especially to improved opaque white pigments—silicates of lead—the method of making them and their application in paint.

In my co-pending United States patent application Serial Number 100,822 filed September 15, 1936, I have disclosed that opaque white pigments may be made by heating a mixture of lead oxide, or a lead compound which upon heating yields lead oxide, and silica (silicon dioxide, $SiO_2$) under controlled temperature conditions whereby the reaction to form lead silicate takes place in the solid phase without fusion, thus ensuring a soft fine texture and other desirable physical qualities in the pigment product.

I have shown that by such process any desired lead silicate such as acid lead silicate ($PbSi_2O_5$), normal lead silicate ($PbSiO_3$) and basic lead silicate ($Pb_2SiO_4$) can be prepared, and I have disclosed that lead silicates having other proportions can be made which apparently are either mixtures of those definite chemical compounds or in case an excess of either lead oxide or silica has been used the product may contain some free oxide or the excess oxide may exist as a solid solution in the silicate.

I have found that such lead silicate pigments made as described in my application referred to are not stable to the action of light, acquiring a gray or gray-brown tone or color in a few hours under the action of direct sunlight or after a longer period in diffused light. All of the lead silicate pigments whether acid, normal or basic are, to some extent unstable to light but I have found that the instability increases with the basicity of content of lead oxide in the pigment. While such lead silicate pigments make paints which are exceptionally durable when exposed to light and weather, the unstable characteristic of the pigment still persists after grinding with drying oil vehicles such as linseed oil, tung oil, and oil varnishes. The resulting white paints upon exposure to light soon acquire a grayish color which gradually becomes darker. Thus such unstable lead silicates are not available for making white or light tinted paints.

I have now discovered that light-stable lead silicate pigments can be made, which will not darken and discolor when exposed to light, by adding to the mixture of lead compound and silica a small amount of a white oxide of one of the elements of Group II of the periodic system, and then heating the charge until the ingredients chemically combine in the solid phase to form lead silicate without fusion of the charge. Of the class of stabilizers referred to I have found the bi-valent oxides of magnesium, calcium, barium, strontium and zinc particularly satisfactory since they are industrially and economically available. I can also use compounds of the stabilizing elements referred to which upon heating yield the oxides—for example, the hydrates, carbonates and nitrates. The stabilizers should preferably not be used in excess of 5% for, while larger amounts are effective, they unnecessarily change the chemical composition of the pigment, reducing the percentage of lead silicate, the characteristic properties of which it is desired to retain. Preferably I use the stabilizing compounds, calculated as the oxides, in the proportion of one to three percent of the product, since such proportions give the most satisfactory results, but I have found lesser quantities, for example, one-half percent improves the product to a considerable degree.

My method of stabilizing lead silicate pigments can be applied to substantially pure lead silicates of any desired composition. I have discovered that, not only can I make stable lead silicate pigments approximating the regular molecular proportions such as acid lead silicate, $PbSi_2O_5$, normal lead silicate, $PbSiO_3$, and basic lead silicate, $Pb_2SiO_4$, but I can also make equally useful lead silicate with any basicity desired between the regular normal and basic formulae or of any acidity desired between the regular acid and normal formulae. I can also make useful lead silicate pigments containing a higher percentage of silica than the regular acid formula, $PbSi_2O_5$, but, though such a pigment is cheaper, its hiding power is reduced and thus there is a practical limit based upon utility of the product in its application. Such a practical limit appears to be an acid lead silicate containing not less than 85% actual lead silicate calculated as regular acid lead silicate, $PbSi_2O_5$, and about 15% silica plus stabilizer. The excess silica may be chemically combined or in solid solution or, possibly, partially in the free state.

Before giving detail examples showing the operation of my process and characteristics of the various products I shall give some general information relative to the raw materials, process and product.

The material used should be as free from impurities as possible consistent with industrial availability, since small amounts of iron or other impurity tend to discolor the product. Either litharge (PbO) or other oxides of lead such as red lead ($Pb_3O_4$) or lead peroxide ($PbO_2$) may be used as a source of lead. Other lead compounds which yield the oxide upon heating may also be employed, such as white lead ($2PbCO_3.PbH_2O_2$). The silica and stabilizing compounds supplying oxides of magnesium, calcium, barium, zinc etc. should be as pure as commercially obtainable and preferably should be finely divided to facilitate thorough mixing and blending of the charge.

I first thoroughly mix the materials in the required proportions either by dry-milling or, preferably, by wet-milling thereby reducing particle size and also assuring a very close association of the ingredients. The milling may be done either in a batch or a continuous type of mill; in either case by using a porcelain or silex lining to avoid contamination of materials.

The slurry from the wet-mill is dewatered as by settling and decantation and/or filtration.

Any suitable equipment may be used, such as Dorr tanks and filter presses.

If the mixture is prepared by dry-milling the stabilizer is added and milled with the lead compound and silica. If the mixture is wet-milled the stabilizer is similarly added and milled with the other ingredients, provided it is insoluble in water. If the stabilizer is water-soluble—for example, barium nitrate—it is reserved and added to the wet pulp after dewatering the slurry from the mill. The water in the pulp quickly dissolves the small amount of water-soluble stabilizer which is then easily incorporated by simple mixing.

The wet pulp is then charged directly into the heating furnace, or it may be preliminarily dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. Whatever type of furnace is used, means should be provided for close control of temperature. In furnaces where products of combustion contact the charge a neutral or oxidizing flame should be maintained to avoid possible reduction of metallic oxides.

The time required in the calcining zone depends upon the temperature. The higher the temperature within the permissible range, the shorter the time; however, there is a tendency to clearer color tones at the lower and medium temperature within that range. Lead oxide and silica react at a temperature of 500° C. and at 550° C. I can make a white lead silicate pigment by heating for a period of 48 hours. Lead silicates sinter and fuse if the upper limits of temperature range, 650° C. for the acid, 680° C. for the normal and 725° C. for the basic lead silicate are exceeded for a considerable length of time.

While all my stabilized lead silicates can be made within a temperature range of 550 to 625° C., I prefer the following temperature ranges since at such temperatures the reaction is fairly rapid and yields a product having a soft texture and good hiding power: for lead silicates containing about 55 to 70% PbO, 575 to 610° C., for lead silicates containing about 70 to 85% PbO, 600 to 650° C.; for lead silicates containing above 85% PbO, 640 to 680° C.

Within the preferred temperature ranges specified the silicates require 1 to 2 hours in the calcining zone of the furnace. While the reaction is usually complete in 1 to 1½ hours, it is desirable to hold the charge at the proper temperature a little longer than appears absolutely necessary to insure that the reaction is complete. The progress of the reaction during calcination may be judged by withdrawing a sample from the furnace for inspection. The finished product should be substantially white and should not acquire a yellower color upon milling or grinding the sample in a mortar.

Lead silicate pigments, if not calcined at too high a temperature, are soft in texture and fine enough to be used as pigments for paint, but usually milling is required to break down aggregates, reduce particle size and develop full tinting strength and hiding power of the products.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

Examples showing the working of my process and properties of the resulting white lead silicate pigments are shown in Table I, but such examples should not be construed as limiting the application of my process since many other lead silicate pigments can be made within the general limits of proportions and temperatures. The mixtures in the proportions shown in the table were made by wet-milling the materials together for 1 hour in a porcelain jar mill, dewatering the charge, and drying the mixture. In all cases the stabilizer was included in the mill charge, except in Example 11 where water-soluble barium nitrate was used. In Example 11 the barium nitrate was added and mixed with the wet pulp after dewatering the slurry from the mill. The dry mixtures were heated in an electric furnace under time and temperature conditions shown in the table.

TABLE I

| Example number | 1 | 2 | 3 | 4 |
|---|---|---|---|---|
| | Acid lead silicate, PbSi₂O₅ | Normal lead silicate, PbSiO₃ | | |
| Stabilizing compound used | None | None | Zinc oxide | Calcium oxide |
| Mixture: | | | | |
| Lead oxide, PbO | 64.80 | 78.80 | 77.20 | 76.60 |
| Silica | 35.20 | 21.20 | 20.80 | 20.40 |
| Stabilizer | | | 2.00 | 3.00 |
| Calcining conditions: | | | | |
| Time, hours | 2 | 2 | 2 | 1 |
| Temp., °C | 590 to 610 | 600 to 610 | 620 to 650 | 590 to 610 |
| Treatment of calcined product | Wet-milled 1.5 hours and dried. | Wet-milled 1¼ hours and dried. | Dry-milled | Dry-milled. |
| Composition of pigment, percent: | | | | |
| Lead oxide, PbO | 64.80 | 78.80 | 77.20 | 76.60 |
| Silica | 35.20 | 21.20 | 20.80 | 20.40 |
| Stabilizing oxide | | | ZnO, 2.00 | CaO, 3.00 |
| | 100.00 | 100.00 | 100.00 | 100.00 |
| Physical properties of pigment: | | | | |
| Specific gravity | 4.68 | 5.80 | 5.82 | 5.78 |
| Oil absorption, parts oil per 100 parts pigment | 10.10 | 8.40 | 8.60 | 8.30 |
| Tinting strength, compared with white lead standard=100 | 85 | 95 | 95 | 90 |
| Color stability under exposure to light. Dry pigment and pigment ground in linseed oil exposed to sunlight. | Darkened in 10 hours | Gray color in 10 hours | Stable | Stable. |

TABLE I—Continued

| Example number | 5 | 6 | 7 | 8 |
|---|---|---|---|---|
| | | | Basic lead silicate, $Pb_2SiO_4$ | |
| Stabilizing compound used | Calcium hydrate | Magnesium oxide | None | None |
| Mixture: | | | | |
| Lead oxide, PbO | 78.00 | 78.00 | 88.20 | 85.00 |
| Silica | 21.00 | 21.00 | 11.80 | 15.00 |
| Stabilizer | 1.32 | 1.00 | | |
| Calcining conditions: | | | | |
| Time, hours | 2.5 | 2 | 2 | 3 |
| Temp., °C | 600 to 630 | 600 to 610 | 665 to 675 | 680 to 700 |
| Treatment of calcined product | Dry-milled | Dry-milled | Wet-milled 1½ hours and dried | Dry-milled |
| Composition of pigment, percent: | | | | |
| Lead oxide, PbO | 78.00 | 78.00 | 88.20 | 85.00 |
| Silica | 21.00 | 21.00 | 11.80 | 15.00 |
| Stabilizing oxide | CaO, 1.00 | MgO, 1.00 | | |
| | 100.00 | 100.00 | 100.00 | 100.00 |
| Physical properties of pigment: | | | | |
| Specific gravity | 5.75 | 5.75 | 7.03 | 7.01 |
| Oil absorption, parts oil per 100 parts pigment | 8.80 | 8.50 | 7.10 | 7.00 |
| Tinting strength, compared with white lead standard | 95 | 90 | 100 | 100 |
| Color stability under exposure to light. Dry pigment and pigment ground in linseed oil exposed to sunlight. | Stable | Stable | Darkens in 2 hours. Gray in 10 hours. | Gray-brown in 24 hours |

| Example number | 9 | 10 | 11 | 12 |
|---|---|---|---|---|
| Stabilizing compound used | Zinc oxide | Magnesium oxide | Barium nitrate | Calcium oxide |
| Mixture: | | | | |
| Lead oxide, PbO | 80.00 | 80.00 | 85.00 | 87.00 |
| Silica | 17.00 | 15.00 | 12.00 | 10.00 |
| Stabilizer | 3.00 | 5.00 | 5.10 | 3.00 |
| Calcining conditions: | | | | |
| Time, hours | 1 | 2 | 2 | 2 |
| Temp., °C | 680 to 700 | 650 to 670 | 660 to 670 | 690 to 720 |
| Treatment of calcined product | Dry-milled | Dry-milled | Wet-milled for 1 hour and dried | Wet-milled for 1 hour and dried |
| Composition of pigment, percent: | | | | |
| Lead oxide, PbO | 80.00 | 80.00 | 85.00 | 87.00 |
| Silica | 17.00 | 15.00 | 12.00 | 10.00 |
| Stabilizing oxide | ZnO, 3.00 | MgO, 5.00 | BaO, 3.00 | CaO, 3.00 |
| | 100.00 | 100.00 | 100.00 | 100.00 |
| Physical properties of pigment: | | | | |
| Specific Gravity | 6.99 | 7.00 | 7.08 | 7.03 |
| Oil absorption, parts oil per 100 parts pigment | 7.20 | 7.40 | 7.50 | 7.15 |
| Tinting strength, compared with white lead standard=100 | 110 | 105 | 110 | 105 |
| Color stability under exposure to light. Dry pigment and pigment ground in linseed oil exposed to sunlight. | Stable | Stable | Stable | Stable |

To further show working of my process Example 13 is given where a compound of lead is used instead of lead oxide and the lead silicate pigment is proportioned to contain less lead oxide than the regular acid lead silicate, $PbSi_2O_5$.

*Example 13*

A mixture of 63.7 parts of basic lead carbonate, $2PbCO_3.PbH_2O_2$ (white lead), 44 parts of silica and 2.06 parts of barium hydrate, $Ba(OH)_2.8H_2O$, equal to one part of barium oxide, were dry-milled for one hour.

The milled charge was calcined for 2 hours at a temperature of 575 to 585° C.

The calcined product was then wet-milled for 1 hour, dewatered and dried.

Analysis of pigment: Percent
- Lead oxide, PbO _____ 55
- Silica _____ 44
- Barium oxide _____ 1

Physical properties:
- Specific gravity _____ 4.58
- Oil absorption, (parts of oil per 100 parts of pigment) _____ 10.60
- Tinting strength (compared with white Lead Standard=100) _____ 70

The pigment is stable and does not discolor under the action of light.

Although the discoloration of lead silicate pigments when exposed to light and its prevention, has been the subject of much investigation, the reaction whereby the pigments are stabilized is not clear. The small amounts of the oxides calcium, barium, magnesium and zinc used as stabilizers probably combine with some of the lead silicate to form double silicates, though the pigment remains essentially a lead silicate and retains its characteristic of imparting durability to paints.

Two classes of white pigments are generally recognized: (1) The opaque white pigments, such as white lead, zinc oxide and titanium pigments which impart opacity and whiteness when mixed with oil or other organic vehicle; and (2) The extender pigments, such as whiting and china clay which do not impart appreciable opacity when similarly mixed with vehicles.

The opaque pigments of class (1) are further sub-divided into two classes: (a) those which are reactive or capable of combining chemically or physico-chemically with ingredients of the vehicle, such as white lead and zinc oxide: and (b) those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My new lead silicate pigments belong to the class of opaque reactive pigments, though they differ in degree of reactivity as indicated by the rate of drying when the pigments are mixed with raw linseed oil and exposed as a paint film.

The properties of my lead silicate pigments adapt them for application to oil, enamel and lacquer type paints and for other purposes where white pigments are used, such as for rubber, linoleum and other floor coverings, printing inks, vitrified enamel, et cetera but I have found them particularly desirable for the preparation of exterior paints.

In the field of paints for exterior use much investigation has been conducted for many years in an effort to combine the best features of the various opaque white pigments, but, while much progress has been made, the improvement in one feature has too often been accompanied by a loss of other desirable properties. Heretofore white lead carbonate appears to have been the only white opaque pigment which, without admixture of other pigments, will make a reasonably satisfactory exterior paint. Zinc oxide desirably hardens the paint film, but when used without admixture of other pigments will check and crack: admixture with white lead is the usual practice. Lithopone pigment because chemically unstable to atmospheric influences fails rapidly and is little used in high-grade exterior paints. Titanium pigments are in great demand for their excellent hiding power, but fail rapidly by chalking when used alone in exterior paints. The manufacturers of paints now recommend admixture of titanium pigments with white lead, zinc oxide or both, thus improving the paint to a certain extent. However, titanium pigments with white lead and linseed oil vehicle while durable, rapidly accumulates dirt and mildew. The addition of zinc oxide prevents dirt collection and mildew, but in a short time chalking takes place with consequent fading of tinted paints. Chalking and fading of tinted paints also occurs within a short time when mixtures of titanium pigments and zinc oxide are used with a linseed oil vehicle.

From what I have heretofore stated about white silicate pigments, it is evident that hiding power, being in most cases in the order of white lead in that respect, is not of special importance, though the hiding power is sufficient to make paints which will cover or hide the surface with the usual number of coats. The outstanding characteristic of lead silicate pigments is their capacity to impart durability to paints.

I have discovered that paints made with my lead silicate pigments ground with raw linseed oil vehicle are exceptionally durable as regards gloss retention and resistance to checking and chalking of the paint film and are remarkably free from dirt collection and mildew. I have also discovered that these characteristics are imparted to paints containing mixtures of pigments one of which is a lead silicate. Thus combinations of lead silicate with titanium pigments largely prevent the chalking, fading of tints, loss of gloss and dirt collection to which titanium paints are subject and prevent checking and cracking when combined with either zinc oxide or lithopone pigments. The chalking which takes place with white lead paints is also retarded.

The cleanness of surface and freedom from dirt collection and mildew of paints containing lead silicate I attribute to the reactive properties of the pigment resulting in paint films which dry to a relatively harder surface.

For exterior paints made with mixed pigments and raw linseed oil vehicle, I prefer to have the lead silicate about 50% of the pigment combination, but lesser amounts may be used with good results and improvement roughly proportional to the percentage used. I have also found the improvement of paints when lead silicate is added to a plurality of pigments, either a mixture of opaque pigments or a mixture containing a colored or tinting pigment or an extender pigment which is often added to increase the pigment volume concentration or to cheapen the paint.

I have furthermore discovered that lead silicates, especially basic lead silicates, give remarkable protection to iron and steel under exposure to light, weather and other influence. This result I attribute to the reactive nature of the pigments, the lead silicates functioning like free oxides of lead such as red lead which for many years has been used with linseed oil as paint where maximum protection of iron or steel is desired.

I claim as my invention:

1. The method of making a substantially pure, white, anhydrous, light-stable lead silicate pigment, which consists in intimately mixing lead oxide, silica and a white oxide of an element of Group II of the periodic system and then heating the mixture to a temperature sufficiently high to chemically combine the ingredients in the solid phase without fusion to form said lead silicate pigment.

2. The method of making a substantially pure, white, anhydrous, light-stable lead silicate pigment, which consists in intimately mixing a lead compound which upon heating yields lead oxide, silica and a white oxide of an element of Group II of the periodic system and then heating the mixture to a temperature sufficiently high to chemically combine the ingredients in the solid phase without fusion to form said lead silicate pigment.

3. The method of making a substantially pure, white, anhydrous, light-stable lead silicate pigment, which consists in intimately mixing lead oxide, silica and a compound which upon heating yields a white oxide of an element of Group II of the periodic system and then heating the mixture to a temperature sufficiently high to chemically combine the ingredients in the solid phase without fusion to form said lead silicate pigment.

4. The method of making a substantially pure, white, anhydrous, light-stable lead silicate pigment containing 1 to 3% of a stabilizing oxide from the group, magnesium oxide, calcium oxide, barium oxide, strontium oxide and zinc oxide, which consists in intimately mixing lead oxide, silica and a compound which upon heating yields the stabilizing oxide, and then heating the mixture in the temperature range 550 to 725° C. until the ingredients chemically combine in the solid phase without fusion to form said lead silicate pigment.

5. The method of making a substantially pure, white, anhydrous, light-stable lead silicate pigment containing 1 to 3% magnesium oxide (MgO) which consists in intimately mixing lead oxide, silica and magnesium oxide and then heating the mixture in the temperature range 550 to 725° C. until the ingredients chemically combine in the solid phase without fusion to form said lead silicate pigment.

6. The method of making a substantially pure, white, anhydrous, light-stable lead silicate pigment containing 1 to 3% calcium oxide (CaO), which consists in intimately mixing lead oxide, silica and calcium oxide and then heating the mixture in the temperature range 550 to 725° C. until the ingredients chemically combine in the solid phase without fusion to form said lead silicate pigment.

7. The method of making a substantially pure, white, anhydrous, light-stable lead silicate pigment containing 1 to 3% zinc oxide (ZnO), which consists in intimately mixing lead oxide, silica and zinc oxide and then heating the mixture in the temperature range 550 to 725° C. until the ingredients chemically combine in the solid phase without fusion to form said lead silicate pigment.

8. The method of stabilizing a substantially pure, white, anhydrous lead silicate pigment against discoloration under the action of light, which consists in intimately mixing lead oxide, silica, and a compound of one of the elements of Group II of the periodic system which upon heating yields a white oxide, in such quantity as required to supply 1 to 5% of said white oxide, and then heating the mixture at a temperature sufficiently high to chemically combine the ingredients in the solid phase without fusion to form said stabilized lead silicate pigment.

9. A substantially pure, anhydrous, light-stable, opaque, white pigment consisting essentially of lead silicate and not more than 5% of a chemically combined white oxide of an element of Group II of the periodic system.

10. A substantially pure, anhydrous, light-stable, opaque, white pigment consisting essentially of lead silicate and not more than 5% of chemically combined magnesium oxide (MgO).

11. A substantially pure, anhydrous, light-stable, opaque, white pigment consisting essentially of lead silicate and not more than 5% of chemically combined calcium oxide (CaO).

12. A substantially pure, anhydrous, light-stable, opaque, white pigment consisting essentially of lead silicate and not more than 5% of chemically combined zinc oxide (ZnO).

13. A substantially pure, anhydrous, light-stable, opaque, white, lead silicate pigment containing 55 to 87% lead oxide, 10 to 44% silica and 1 to 3% of a chemically combined oxide from the group, magnesium oxide, calcium oxide, barium oxide, strontium oxide and zinc oxide.

14. A substantially pure, anhydrous, light-stable, opaque, white, lead silicate pigment containing 55 to 87% lead oxide, 10 to 44% silica and 1 to 3% of chemically combined magnesium oxide (MgO).

15. A substantially pure, anhydrous, light-stable, opaque, white, lead silicate pigment containing 55 to 87% lead oxide, 10 to 44% silica and 1 to 3% of chemically combined calcium oxide (CaO).

16. A substantially pure, anhydrous, light-stable, opaque, white, lead silicate pigment containing 55 to 87% lead oxide, 10 to 44% silica and 1 to 3% of chemically combined zinc oxide (ZnO).

17. The method of making a substantially pure, white, anhydrous, light-stable lead silicate pigment, which consists in making a mixture of silica, a lead compound which upon heating will supply to the product only lead oxide and a compound which upon heating will supply to the product only a white oxide of an element of Group II of the periodic system and then heating the mixture at a temperature sufficiently high to chemically combine the ingredients in the solid phase without fusion to form said lead silicate pigment.

18. The method of making a substantially pure, white, anhydrous, light-stable lead silicate pigment which consists in making a mixture of lead, silicon and alkaline earth metal compounds which upon heating will supply to the product respectively only lead, silicon and alkaline earth metal oxides and then heating the mixture until the said oxides chemically combine in the solid phase without fusion to form said lead silicate pigment.

19. The method of making a substantially pure, white, anhydrous, light-stable lead silicate pigment containing not more than 5% of an alkaline earth metal oxide which consists in making a mixture of lead, silicon and alkaline earth metal compounds which upon heating will supply to the product respectively only lead, silicon and alkaline earth metal oxides and then heating the mixture until the said oxides chemically combine in the solid phase without fusion to form said lead silicate pigment.

20. The method of making a substantially pure, white, anhydrous, light-stable lead silicate pigment containing not more than 5% of an alkaline earth metal oxide which consists in making a mixture of lead, silicon and alkaline earth metal compounds which upon heating will supply to the product respectively only lead, silicon and alkaline earth metal oxides and then heating the mixture in the temperature range 550 to 725°C. until the said oxides chemically combine in the solid phase without fusion to form said lead silicate pigment.

21. A substantially pure, anhydrous, light-stable opaque, white pigment consisting essentially of lead silicate and not more than 5% of a chemically combined alkaline earth metal oxide.

LOUIS E. BARTON.